（12）United States Patent
Luo et al.

(10) Patent No.: US 12,368,968 B2
(45) Date of Patent: Jul. 22, 2025

(54) METHOD AND ELECTRONIC DEVICE FOR GENERATING TEXTURE MAPS THROUGH MULTI-ANGLE LIGHTING CAPTURE

(71) Applicant: ZHEJIANG LINGDI DIGITAL TECHNOLOGY CO., LTD, Zhejiang (CN)

(72) Inventors: Likang Luo, Zhejiang (CN); Tanghao Tian, Zhejiang (CN); Chen Liu, Zhejiang (CN)

(73) Assignee: ZHEJIANG LINGDI DIGITAL TECHNOLOGY CO., LTD, Hangzhou (CN)

( * ) Notice: Subject to any disclaimer, the term of this patent is extended or adjusted under 35 U.S.C. 154(b) by 153 days.

(21) Appl. No.: 18/371,271

(22) Filed: Sep. 21, 2023

(65) Prior Publication Data

US 2024/0015408 A1    Jan. 11, 2024

Related U.S. Application Data

(63) Continuation of application No. PCT/CN2022/104361, filed on Jul. 7, 2022.

(30) Foreign Application Priority Data

Oct. 29, 2021    (CN) .......................... 202111271818.3

(51) Int. Cl.
*H04N 23/84*    (2023.01)
*G03B 15/04*    (2021.01)
(Continued)

(52) U.S. Cl.
CPC ......... *H04N 23/841* (2023.01); *G03B 15/041* (2013.01); *G06T 15/04* (2013.01); *H04N 23/81* (2023.01); *H04N 23/86* (2023.01)

(58) Field of Classification Search
CPC ...... G03B 15/00; G03B 15/03; G03B 15/041; G03B 15/06; H04N 23/81; H04N 23/841;
(Continued)

(56) References Cited

U.S. PATENT DOCUMENTS 11,037,051 B2 *   6/2021   Kim ....................... G06F 18/21

FOREIGN PATENT DOCUMENTS

CN          105262927 A      1/2016
CN          107146264 A      9/2017
(Continued)

OTHER PUBLICATIONS

International Search Report of PCT/CN2022/104361.
Written Opinion of PCT/CN2022/104361.

*Primary Examiner* — Antoinette T Spinks

(57) ABSTRACT

The present disclosure discloses a method for generating texture maps through multi-angle lighting photographing, comprising: constructing a multi-angle lighting photographing environment; photographing color chart images for color correction matrix; photographing white paper images for light intensity correction coefficient; capturing calibration images for transparency calculation; photographing object images for color correction and light intensity correction, including images without backlighting and images with backlighting; generating base color maps, normal maps, metallic maps, roughness maps, and transparency maps. The present disclosure also discloses a storage medium, wherein a computer program is stored, and the computer program is configured to be executed at runtime to perform the above-mentioned method. The present disclosure further discloses an electronic device comprising a memory and a processor, wherein the memory stores a computer program, and the processor is configured to run the computer program to execute the above-mentioned method.

20 Claims, 5 Drawing Sheets

(51) Int. Cl.
*G06T 15/04* (2011.01)
*H04N 23/81* (2023.01)
*H04N 23/86* (2023.01)

(58) Field of Classification Search
CPC ....... H04N 23/86; G06T 11/001; G06T 15/04;
G06T 2207/10016; G06T 2207/10024;
G06T 2207/10152; G06T 2207/30164;
G06T 7/40
See application file for complete search history.

(56) References Cited

FOREIGN PATENT DOCUMENTS

| | | | |
|---|---|---|---|
| CN | 109523619 | A | 3/2019 |
| CN | 114119779 | A | 3/2022 |
| JP | 2015125537 | A | 7/2015 |
| JP | 2020197774 | A | 12/2020 |

\* cited by examiner downback difference.png downfront difference.png downleft difference.png downright difference.png top difference.png upback difference.png upfront difference.png upleft difference.png upright difference.png

METHOD AND ELECTRONIC DEVICE FOR GENERATING TEXTURE MAPS THROUGH MULTI-ANGLE LIGHTING CAPTURE

CROSS-REFERENCE TO RELATED APPLICATION

This application is a bypass continuation application of PCT application no.: PCT/CN2022/104361. This application claims priorities from PCT Application PCT/CN2022/104361, filed Jul. 7, 2022, and from Chinese patent application no. 202111271818.3, filed Oct. 29, 2021, the contents of which are incorporated herein in the entirety by reference.

TECHNICAL FIELD

The present disclosure relates to the field of computer graphics, specifically to a method, storage medium, and electronic device for generating texture maps through multi-angle lighting photographing.

BACKGROUND

A patent with publication number CN 105262927 B discloses an FSM3D fabric high-definition scanner, which consists of a camera body cover, a single-lens reflex camera, a chassis frame, chassis side panels, a sliding drawer for placing the scanned fabric, and a plug-in scanner control host. The chassis frame is equipped with six sets of LED light sources and cold light panel light sources. The patented technology generates an output file containing 3D material texture maps, including diffuse maps, normal maps, displacement maps, specular maps, and transparency maps.

Another patent with publication number CN 107146264 B discloses a method for extracting material surface geometry and lighting physical properties, comprising: Step 1, setting up a photographing environment; Step 2, photographing images for light compensation; Step 3, photographing material images; Step 4, calculating the geometric surface shape of the material surface; Step 5, calculating the diffuse coefficient of the material surface; Step 6, calculating the specular reflection coefficient of the material surface; Step 7, calculating the displacement information of the material surface; Step 8, calculating the transparency value of the material.

With the advancement of rendering technology and the increasing demand for high-quality modeling, more and more 3D applications are adopting Physically Based Rendering (PBR) techniques. Achieving realistic rendering results requires the support of high-quality texture maps. In typical PBR rendering systems, the required texture maps mainly include base color maps, normal maps, metallic maps, roughness maps, and transparency maps. Existing material scanning techniques primarily rely on image processing methods, such as overlaying, subtracting, inverting, blurring, and filtering images of the material under different lighting conditions to obtain its texture maps. However, these existing methods have some significant shortcomings:

1. Affected by the color of the material itself, the generated texture maps tend to be biased towards color divisions, resulting in less accurate representation.
2. The analysis of highlights, specifically metallic and roughness aspects, is inadequate, leading to inaccuracies in the final output.
3. The variety of generated texture maps may not be comprehensive or suitable for high-quality PBR rendering systems, limiting their adaptability to such systems.

SUMMARY

In view of the aforementioned technical issues and existing shortcomings in the field, the present disclosure provides a method for generating texture maps through multi-angle lighting photographing. This method enables the generation of high-quality base color maps, normal maps, metallic maps, roughness maps, and transparency maps, particularly suitable for PBR rendering.

A method for generating texture maps through multi-angle lighting photographing, comprising the following steps:

1) Constructing a multi-angle lighting photographing environment.

wherein the multi-angle lighting photographing environment comprises a box; the box houses a testing platform, a photographing device, and a detachable multi-angle light source; the photographing device (6) is positioned directly above the testing platform, while the multi-angle light source are located beneath the photographing device, enabling illumination of the testing platform from different angles; the light sources include, from top to bottom, the top light source, upper light source, lower light source, and bottom light source; the top light source, upper light source, and lower light source are situated above the testing platform; each of the top light source, upper light source, lower light source, and back light source is independently composed of at least one group of lamps.

2) Placing a color chart on the testing platform and always photographing the color chart with only one group of lights turned on. traversing all the lower light sources, upper light sources, and top light sources. Processing the obtained images using a standard color calibration procedure to generate corresponding color correction matrix for each lighting direction.

3) Placing a flat white paper on the testing platform and always photographing the white paper with only one group of lights turned on. traversing all the lower light sources, upper light sources, and top light sources. For any white paper image captured with a specific lighting direction, applying the color correction matrix, corresponding to the same lighting direction, to generate a color-corrected white paper image. Further processing the color-corrected image to calculate the corresponding light intensity correction coefficient for the respective lighting direction.

4) Placing nothing on the testing platform (5), and capturing calibration images for transparency calculation: turning on all lower light sources, photographing to obtain an image without backlighting, referred to as ImageAlpha0; turning on all bottom and lower light sources, photograhing to obtain an image with backlighting, referred to as ImageAlpha15) Placing the object to be scanned on the testing platform.

Always photographing images of the object with only one set of lights turned on. traversing all the lower light sources, upper light sources, and top light sources. For each captured image of the object, applying the color correction matrix corresponding to the same lighting direction to generate calibrated images of the object. Multiplying the R (red), G (green), B (blue) values of each pixel in the color-corrected object image by the corresponding light intensity correction coefficient generated under the same lighting direction to obtain the final corrected image for that lighting direction.

photographing the object to be scanned with all lower light sources turned on to obtain an image without backlighting, referred to as ImageBlend0.

photographing the object to be scanned with all bottom and lower light sources turned on to obtain an image with backlighting, referred to as ImageBlend1.

6) Generating the base color texture map.
7) Generating the roughness texture map.
8) Generating the metallic texture map.
9) Generating the normal texture map.
10) Generating the transparency texture map.

The multi-angle lighting photographing environment of the present disclosure includes detachable multi-angle light sources, which can be quickly repaired and replaced in case of any abnormality in the light sources.

The method for generating texture maps through multi-angle lighting photographing, as disclosed in the present disclosure, can utilize the following preferred technical features:

in Step 1):

The top light source is a light source board with perforations and/or transparent areas (using materials such as glass) to allow the photographing device's imaging light path to pass through and/or transmit. The top light source is aligned directly or equivalently aligned with the testing platform and can be composed of one or multiple LED lights. In comparison to using multiple light strips or combinations of light sources, this disclosure utilizes a single light source board as the top source, resulting in more uniform lighting and effectively enhancing the simulation effect.

The upper light source includes multiple groups of upper lights arranged in a circumferential manner along the inner side wall of the box near the top, capable of tilting to illuminate the testing platform.

The lower light source includes multiple groups of lights arranged around the inner sidewall of the box, near the bottom.

This disclosure divides the lateral light sources into two groups, upper and lower, to provide more lighting angles, increase simulation samples, and improve simulation accuracy.

Preferably, the lower lights are oriented vertically or at an inclined angle downward towards the testing platform.

The installation of the bottom light source can be embedded within the testing platform, placed beneath the testing platform, or a combination of the aforementioned methods.

The top light source, upper light source, and lower light source are all equipped with diffusers to achieve a more even distribution of light, resulting in better effects when photographing smooth objects.

Additionally, it is further preferred that the top light source and bottom light source are each composed of one group of lights, while the upper light source and lower light source are each composed of at least four groups of lights. This design with multiple angles for the light source in the present disclosure can provide more simulated samples, thereby improving simulation accuracy.

In a preferred example, Step 3) involves dividing each pixel's R, G, and B values of the color-corrected white paper image by 225 to obtain the light intensity correction coefficient corresponding to each pixel under the respective lighting direction.

In another preferred embodiment: Step 6) specifically comprises:

Summing the R, G, B values of pixels at the same position in each of the calibrated images from Step 5). Selecting the pixel at the corresponding position in the corrected image with the second smallest total sum of R, G, B values as the base color for the corresponding position in the base color texture map.

traversing all position pixels to generate the base color texture map.

In a preferred embodiment, Step 7) specifically comprises:

Subtracting the R, G, B values of pixels at the same position in each of the calibrated images from Step 5) with the corresponding R, G, B values of pixels in the base color texture map. If the resulting difference is ≤0, it is set to 10; otherwise, it remains unchanged. Then, calculating the variance and range of all differences to calculate the roughness at the corresponding position of the roughness map using the following formula:

$$roughness = 6.5*variance - 0.3*range;$$

traversing all position pixels to generate the roughness texture map.

In another preferred embodiment, Step 8) involves the following method to calculate the metallic value of any pixel on the metallic map:

First, sum the R, G, B values at that position in the base color texture map.

If condition I is met, i.e., the sum of R, G, and B values is less than 390, then the metallic value at that position pixel on the metallic texture map is 0.

If condition I is not met, then subtract the R, G, B values of the same position pixels on each correction image obtained in Step 5 from the R, G, B values of the corresponding position pixels on the basic color map. Obtain the maximum difference r, g, b for each channel (R, G, B) and calculate the deviation as follows:

$$deviation = |r-g| + |g-b|;$$

If condition II is met, i.e., the sum of r, g, b is less than 300 and the deviation is less than 30, then the metallic value at that position pixel on the metallic texture map remains 0.

If neither Condition I nor Condition II is met, then divide the sum of r, g, b by 2 to determine the metallic value at that position in the metallic texture map.

traversing all position pixels to generate the metallic texture map.

In a preferred embodiment, Step 9) specifically comprises:

9-1) Converting all the calibrated images for the corresponding lower light source from Step 5) into grayscale images. Applying a Butterworth high-pass filter with $D_0=20$ and $n=2$ to remove uneven illumination, shadows, and the impact of the base color. Linearly mapping all pixel's R, G, B values to the range of 0 to 255 for contrast enhancement.

9-2) Establishing a three-dimensional coordinate system with the center of the testing platform as the origin. For any calibrated image processed in Step 9-1) and any pixel $P_{xy}$ position on it, where x and y represent the two-dimensional coordinates on the plane of that image, considering the center of the image as O, and the center of the light source corresponding to the lighting direction of that image as $P_i$. Calculating the light incidence direction $V = (O - P_i) + 0.2*(P_{xy} - P_i)$.

Calculating the brightness of pixel $P_{xy}$, $Lumin = R_{xy}*0.299 + G_{xy}*0.587 + B_{xy}*0.114$, where $R_{xy}$, $G_{xy}$, $B_{xy}$ represent the R, G, B values of pixel $P_{xy}$, respectively.

Multiplying the brightness Lumin of the same position pixel in the calibrated images processed in Step 9-1) with the corresponding light incidence direction V and then summing them up to obtain the normal value of that position pixel.

traversing all position pixels to generate the normal texture map.

In a preferred embodiment, Step 10) involves the following method to calculate the transparency alpha alpha of any pixel on the transparency texture map:

$$\text{alpha} = 1 - \frac{C_0 - C_1}{C_d - C_e},$$

wherein $C_d$ represents the color of the pixel at that position in the image ImageAlpha0, $C_e$ represents the color of the pixel at that position in the image ImageAlpha1, $C_0$ represents the color of the pixel at that position in the image ImageBlend0, and $C_1$ represents the color of the pixel at that position in the image ImageBlend1.

traversing all position pixels to generate the transparency texture map.

The present disclosure further provides a storage medium, wherein the storage medium stores a computer program, and the computer program is configured to be executed at runtime to perform the method for generating texture maps through multi-angle lighting photographing as described above.

The present disclosure also provides an electronic device comprising a memory and a processor, wherein the memory stores a computer program, and the processor is configured to run the computer program to execute the method for generating texture maps through multi-angle lighting photographing as described above.

Compared with the prior art, the main advantages of the present disclosure include:

1. The present disclosure is based on the principles of Physically Based Rendering (PBR), enabling comprehensive texture map generation. It is compatible with the majority of popular rendering systems currently available. Additionally, the calculations involved are straightforward, leading to fast texture map generation.

2. The present disclosure uses the method of subtracting image colors from the base colors, effectively eliminating the influence of the object's inherent color on texture attribute calculations. This results in more accurate roughness and metallic calculations, leading to higher-quality generated texture maps.

| In the FIGURES: | | |
|---|---|---|
| 1-1. Lower LED light | 1-2. Upper LED light | 3. Light source board |
| 4. Bottom LED light | 5. Testing platform | 6. photographing device |
| 7. Main control board | 10. Box | 11. Door |
| 12. Top cover | 13. Sensor | 14. Multi-angle light source |

DESCRIPTION OF EMBODIMENTS

In the following description, with reference to the accompanying drawings and specific embodiments, the present disclosure will be further explained. It should be understood that these embodiments are provided for illustrative purposes and do not limit the scope of the disclosure. For operations not explicitly specified in the following embodiments, standard conditions or conditions recommended by the manufacturer are typically used.

In this embodiment, the method for generating texture maps through multi-angle lighting photographing includes the following steps:

1) Constructing a multi-angle lighting photographing environment.

Figure 1:
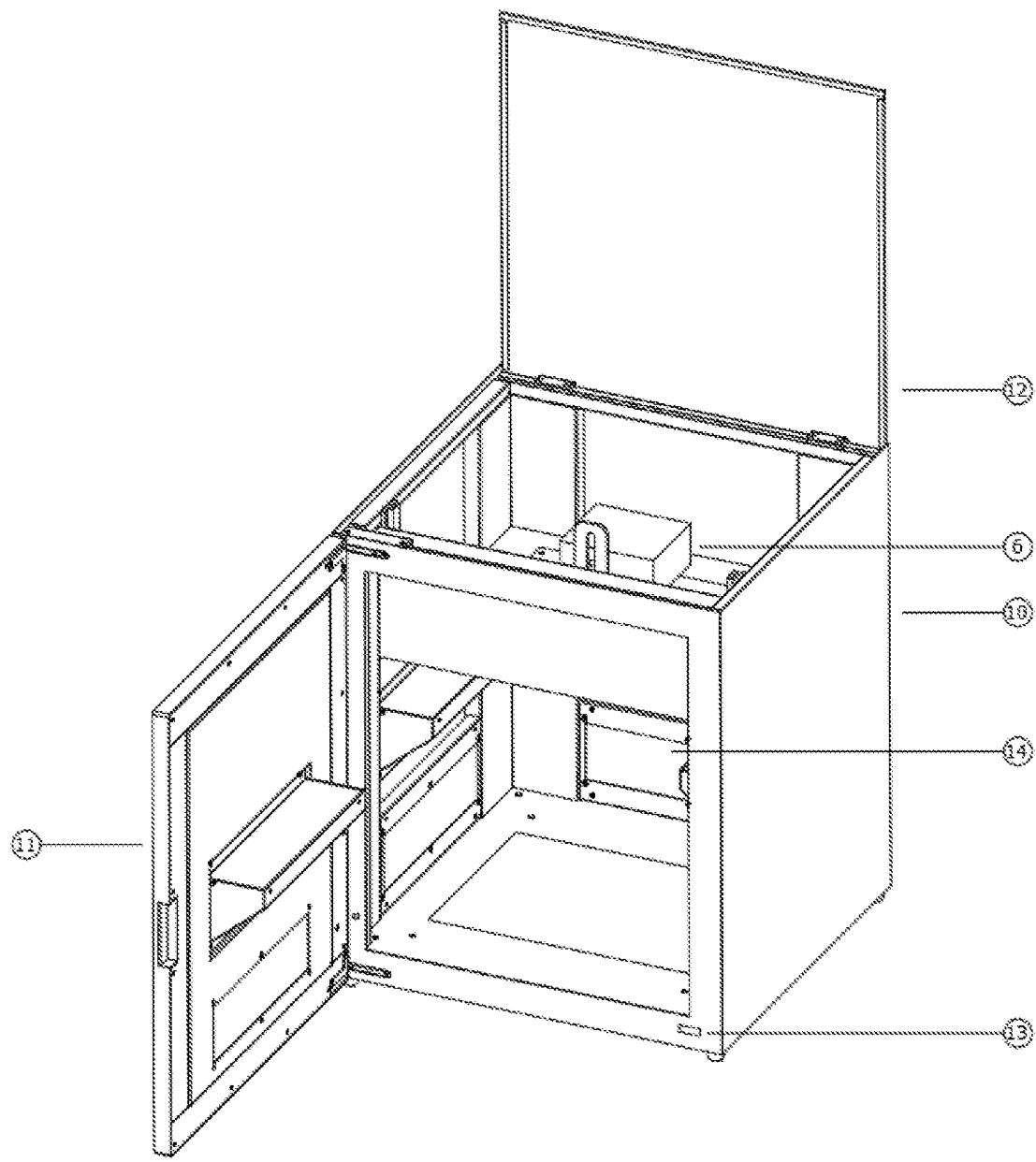
FIG. 1 is a schematic flowchart of the overall structure of the multi-angle lighting photographing environment in the embodiment.
Figure 2:
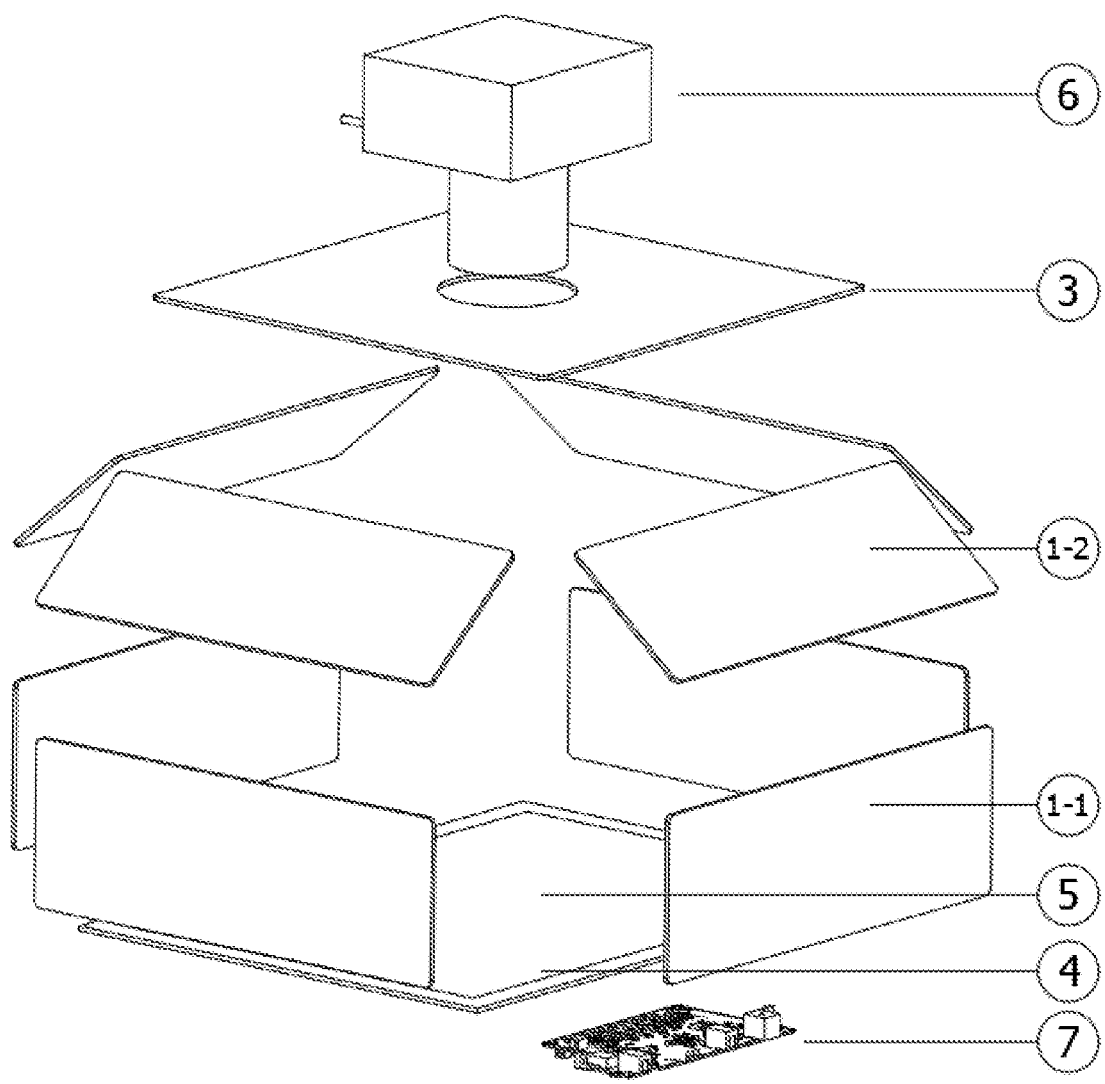
FIG. 2 is a schematic diagram of the internal structure of the multi-angle lighting photographing environment in the embodiment.

As shown in FIG. 1 and FIG. 2, the multi-angle lighting photographing environment includes a box 10. The interior of the box 10 is made of light-absorbing material to reduce light reflection. The box 10 has approximate dimensions of 60 cm in length and width and about 45 cm in height.

The interior of the box 10 is equipped with a main control board 7, a testing platform 5, a photographing device 6, and a removable multi-angle light source 14.

The photographing device 6 is positioned directly above the testing platform 5 on the top center of the box 10 and shoots photos of the objects on the testing platform 5 illuminated by different angles of light. It can consist of one or more DSLR cameras or cameras.

The multi-angle light source 14 is located below the photographing device 6 and is used to illuminate the testing platform 5 from different angles. It includes top light sources, upper light sources, lower light sources, and bottom backlight arranged sequentially from top to bottom. The top light source, upper light sources, and lower light sources are located above the testing platform 5.

The top light source is a square light source board 3 made of LED lights emitting light as a whole. The light source board 3 has through-holes for the light path of the photographing device 6 to pass through and/or penetrate. The images obtained from the light photographing of the light source board 3 are defined as "top".

The upper light sources consist of four groups of rectangular upper LED lights 1-2 arranged around the inner side walls of the box 10 near the top. They can be tilted to illuminate the testing platform 5 from different angles, for example, tilted at 45 degrees towards the testing platform 5 for lighting. Each group of the upper LED lights 1-2 photographings images under different lighting conditions, and they are named upfront (image captured by the front upper light), upback (image captured by the rear upper light), upleft (image captured by the left upper light), and upright (image captured by the right upper light).

The lower light sources consist of four groups of rectangular lower LED lights 1-1 arranged around the inner side walls of the box 10 near the bottom, perpendicular to the testing platform 5. Each group of the lower LED lights 1-1 photographings images under different lighting conditions, and they are named downfront (image captured by the front lower light), downback (image captured by the rear lower light), downleft (image captured by the left lower light), and downright (image captured by the right lower light).

The bottom light source is a cold light sheet source, specifically, a set of bottom LED lights 4 embedded in the testing platform 5. It illuminates the object placed on the testing platform 5 from below. The cold light sheet has strong penetration, making it suitable for calculating transparency map textures.

The top light source, upper light source, and lower light source are all equipped with diffusers.

The main control board 7 can independently control the brightness and switch of all LED lights in the multi-angle light source 14.

One side of the box 10 is a switchable door 11, and an induction sensor 13 is provided on the corresponding side of the door 11 to provide feedback on the door's open/close status. The door 11 can be opened entirely, providing ample space for placing and arranging the object to be photographed. When the door 11 is closed, it provides a complete testing environment. If there is any accidental operation of not closing the door 11 or not fully closing the door 11 during the operation, the induction sensor 13 will remind the operator to close the door.

The top surface of the box 10 has an openable top cover 12. When the top cover 12 is closed, it provides physical protection for the photographing device 6 to prevent damage. When the top cover 12 is opened, it facilitates the replacement and maintenance of the photographing device 6.

This embodiment of the multi-angle lighting photographing environment has an open testing platform 5, providing a large operating space, ensuring the consistent placement of the object to be photographed with the final photographing state, and improving the authenticity of the collected data. The multi-angle light source 14 includes 8-direction side LED lights+bottom LED lights+top LED lights layout, photographing a total of 10 sets of sample photos, providing 10 sets of simulated samples, and enhancing the simulation accuracy.

2) Placing a color chart on the testing platform 5 and always photographing the color chart with only one group of lights turned on. traversing all the lower light sources, upper light sources, and top light sources. Processing the obtained images using a standard color calibration procedure to generate corresponding color correction matrix for each lighting direction.

3) Placing a flat white paper on the testing platform 5 and always photographing the white paper with only one group of lights turned on. traversing all the lower light sources, upper light sources, and top light sources. For any white paper image captured with a specific lighting direction, applying the color correction matrix, corresponding to the same lighting direction, to generate a color-corrected white paper image. Further processing the color-corrected image to calculate the corresponding light intensity correction coefficient for the respective lighting direction.

Steps 2) and 3) are only performed during the initial use of the device. The color correction matrix and light intensity correction coefficient can be reused. Color correction enhances color accuracy, while light intensity correction compensates for the impact of the distance and angle of the light sources on the object's reflection intensity.

4) Placing nothing on the testing platform (5), and capturing calibration images for transparency calculation: turning on all lower light sources, photographing to obtain an image without backlighting, referred to as ImageAlpha0; turning on all bottom and lower light sources, photographing to obtain an image with backlighting, referred to as ImageAlpha1.

5) Placing the object to be scanned on the testing platform 5.

Figure 3:
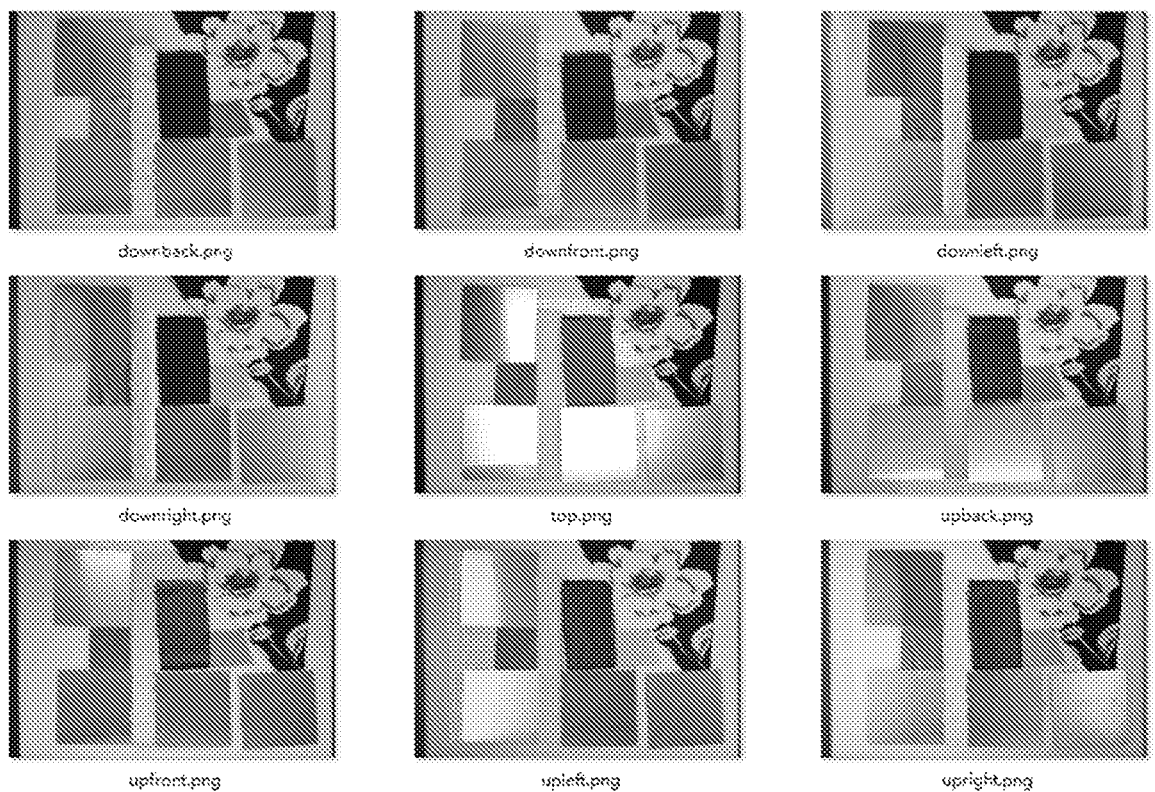
FIG. 3 shows the calibration images of the object to be scanned captured in the method for generating texture maps through multi-angle lighting photographing in the embodiment.

Always photographing images of the object with only one set of lights turned on. traversing all the lower light sources, upper light sources, and top light sources. For each captured image of the object, applying the color correction matrix corresponding to the same lighting direction to generate calibrated images of the object. Multiplying the R, G, B values of each pixel in the color-corrected object image by the corresponding light intensity correction coefficient generated under the same lighting direction to obtain the final corrected image for that lighting direction. The final nine corrected images for different lighting directions are shown in FIG. 3, representing color-corrected and light intensity-corrected images with uniform diffuse distribution and more accurate color reproduction.

photographing the object to be scanned with all lower light sources turned on to obtain an image without backlighting, referred to as ImageBlend0.

photographing the object to be scanned with all bottom and lower light sources turned on to obtain an image with backlighting, referred to as ImageBlend1.

6) Generating the base color texture map, specifically comprising:

Summing the R, G, B values of pixels at the same position in each of the calibrated images from Step 5). Selecting the pixel at the corresponding position in the corrected image with the second smallest total sum of R, G, B values as the base color for the corresponding position in the base color texture map. Choosing the second smallest value helps to reduce the impact of shadows and highlights on the basic color.

traversing all position pixels to generate the base color texture map.

Figure 4:
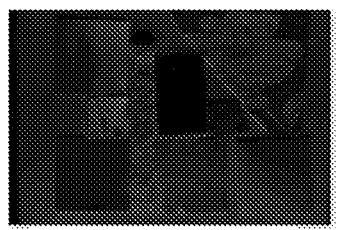
FIG. 4 shows the difference images between the calibration images of the object to be scanned and the base color texture map in the method for generating texture maps through multi-angle lighting photographing in the embodiment.
Figure 4:
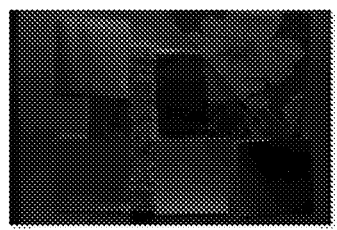
Figure 4:
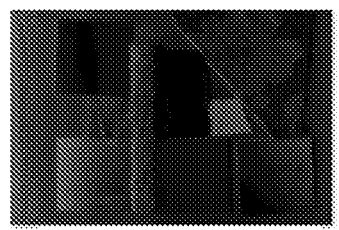
Figure 4:
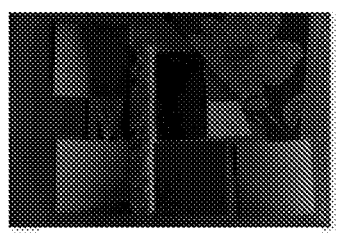
Figure 4:
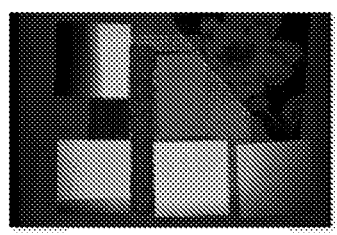
Figure 4:
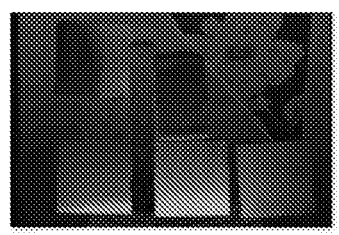
Figure 4:
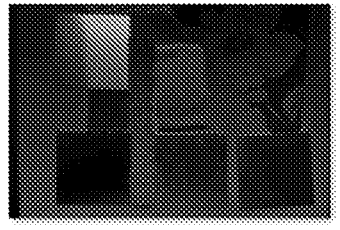
Figure 4:
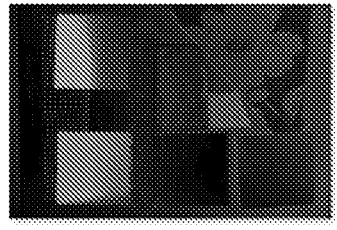
Figure 4:
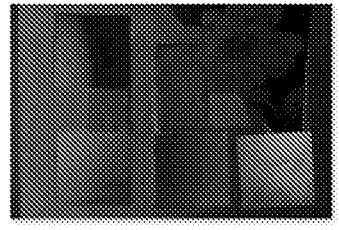

7) Generating the roughness texture map, specifically comprising:

Subtracting the R, G, B values of pixels at the same position in each of the calibrated images from Step 5) with the corresponding R, G, B values of pixels on the base color texture map (nine difference maps can be obtained, as shown in FIG. 4, visualizing the differential data and photographing highlight information). If the resulting difference is ≤0, it is set to 10; otherwise, it remains unchanged. Then, calculating the variance and range of all differences to calculate the roughness at the corresponding position of the roughness map using the following formula:

$$\text{roughness}=6.5*\text{variance}-0.3*\text{range};$$

traversing all position pixels to generate the roughness texture map.

8) Generating the metallic texture map.

For any pixel position in the metallic texture map, the metallic value is calculated as follows:

First, sum the R, G, B values at that position in the base color texture map.

If condition I is met, i.e., the sum of R, G, and B values is less than 390, then the metallic value at that position pixel on the metallic texture map is 0.

If condition I is not met, then subtract the R, G, B values of the same position pixels on each correction image obtained in Step 5 from the R, G, B values of the corresponding position pixels on the basic color texture map (nine difference maps can be obtained, as shown in FIG. 4, visualizing the differential data and photographing highlight information). Obtain the maximum difference r, g, b for each channel (R, G, B) and calculate the deviation as follows:

deviation=|r−g|+|g−b|;

If condition II is met, i.e., the sum of r, g, b is less than 300 and the deviation is less than 30, then the metallic value at that position pixel on the metallic texture map remains 0.

If neither Condition I nor Condition II is met, then divide the sum of r, g, b by 2 to determine the metallic value at that position in the metallic texture map.

traversing all position pixels to generate the metallic texture map.

9) Generating the normal texture map, specifically comprising:

9-1) Converting all the calibrated images for the corresponding lower light source from Step 5) into grayscale images. Applying a Butterworth high-pass filter with $D_0=20$ and n=2 to remove uneven illumination, shadows, and the impact of the base color. Linearly mapping all pixel's R, G, B values to the range of 0 to 255 for contrast enhancement.

9-2) Establishing a three-dimensional coordinate system with the center of the testing platform 5 as the origin. For any calibrated image processed in step 9-1) and any pixel position $P_{xy}$ on it, where x and y represent the two-dimensional coordinates on the plane of that image, considering the center of the image as O, and the center of the light source corresponding to the lighting direction of that image as $P_i$. Calculating the light incidence direction $V=(O-P_i)+0.2*(P_{xy}-P_i)$.

Calculating the brightness of pixel $P_{xy}$, Lumin=$_{xy}R*0.299+G_{xy}*0.587+B_{xy}*0.114$, where $R_{xy}$, $G_{xy}$, $B_{xy}$ represent the R, G, B values of pixel $P_{xy}$, respectively.

Multiplying the brightness Lumin of the same position pixel in the calibrated images processed in Step 9-1) with the corresponding light incidence direction V and then summing them up to obtain the normal value of that position pixel.

traversing all position pixels to generate the normal texture map.

10) Generating the transparency texture map.

For any pixel position in the transparency texture map, the transparency value alpha is calculated by the following method:

$$\text{alpha} = 1 - \frac{C_0 - C_1}{C_d - C_e},$$

wherein $C_d$ represents the color of the pixel at that position in the image ImageAlpha0, $C_e$ represents the color of the pixel at that position in the image ImageAlpha1, $C_0$ represents the color of the pixel at that position in the image ImageBlend0, and $C_1$ represents the color of the pixel at that position in the image ImageBlend1.

traversing all position pixels to generate the transparency texture map.

Figure 5:
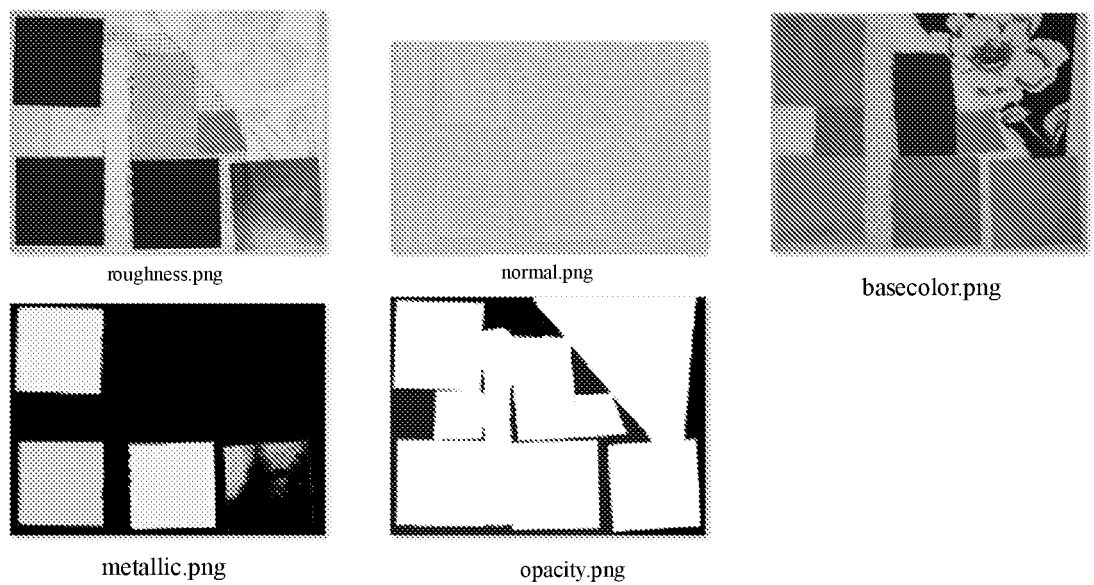
FIG. 5 shows the generated base color texture map, roughness texture map, metallic texture map, normal texture map, and transparency texture map in the method for generating texture maps through multi-angle lighting photographing in the embodiment.

The high-quality base color map, normal map, metallic map, roughness map, and transparency map generated through the method of photographing material texture maps through multi-angle lighting photographing in this embodiment are shown in FIG. 5.

Additionally, it should be understood that after reading the above description of the present disclosure, those skilled in the art can make various changes or modifications to the present disclosure, and these equivalent forms are also within the scope of the claims appended hereto.

The invention claimed is:

1. A method for generating texture maps through multi-angle lighting photographing, comprising the following steps:

1) Constructing a multi-angle lighting photographing environment;
   wherein the multi-angle lighting photographing environment comprises a box (10);
   the box (10) houses a testing platform (5), a photographing device (6), and a detachable multi-angle light source (14);
   the photographing device (6) is positioned directly above the testing platform (5), while the multi-angle light source (14) are located beneath the photographing device (6), for illuminating the testing platform (5) from different angles; the light sources include, from top to bottom, the top light source, upper light source, lower light source, and bottom light source; the top light source, upper light source, and lower light source are situated above the testing platform (5);
   each of the top light source, upper light source, lower light source, and back light source is independently composed of at least one group of lamps;
2) placing a color chart on the testing platform (5) and always photographing the color chart with only one group of lights turned on; traversing all the lower light sources, upper light sources, and top light sources; processing the obtained images using a standard color calibration procedure to generate a corresponding color correction matrix for each lighting direction;
3) placing a flat white paper on the testing platform (5) and always photographing the white paper with only one group of lights turned on; traversing all the lower light sources, upper light sources, and top light sources; for any white paper image captured with a specific lighting direction, applying the color correction matrix, corresponding to the same lighting direction, to generate a color-corrected white paper image;
   further processing the color-corrected image to calculate a corresponding light intensity correction coefficient for the respective lighting direction;
4) placing nothing on the testing platform (5), and capturing calibration images for transparency calculation: turning on all lower light sources, photographing to obtain an image without backlighting, referred to as ImageAlpha0;
   turning on all bottom and lower light sources, photographing to obtain an image with backlighting, referred to as ImageAlpha1;
5) placing an object to be scanned on the testing platform (5),
   photographing the object always with only one set of lights turned on; traversing all the lower light sources, upper light sources, and top light sources; for each captured image of the object, applying the color correction matrix corresponding to the same lighting direction to generate a calibrated image of the object;
   multiplying R, G, B values of each pixel in the color-corrected object image by the corresponding light intensity correction coefficient generated under the same lighting direction, to obtain the final corrected image for that lighting direction;

photographing the object to be scanned with all lower light sources turned on, to obtain an image without backlighting, referred to as ImageBlend0;

photographing the object to be scanned with all bottom and lower light sources turned on, to obtain an image with backlighting, referred to as ImageBlend1;

6) generating a base color texture map;
7) generating a roughness texture map;
8) generating a metallic texture map;
9) generating a normal texture map;
10) generating a transparency texture map.

2. The method according to claim 1, wherein, in step 1): the top light source is a light source board (3) with perforations and/or transparent areas to allow the photographing device's (6) imaging light path to pass through and/or transmit; the upper light source includes multiple groups of upper lights arranged in a circumferential manner along the inner side wall of the box (10) near the top, capable of tilting to illuminate the testing platform (5); the lower light source includes multiple groups of lower lights arranged in a circumferential manner along the inner side wall of the box (10) near the bottom, where the lower lights are oriented vertically toward the testing platform (5) or inclined downward toward the testing platform (5); the installation of the bottom light source can be embedded within the testing platform (5), placed beneath the testing platform (5), or a combination of the aforementioned methods; and the top light source, upper light source, and lower light source are all equipped with diffusers.

3. The method according to claim 1, wherein, in step 3), each pixel's R, G, B values in the color-corrected white paper images are divided by 225, so as to obtain light intensity correction coefficients for each pixel's R, G, B values corresponding to the respective lighting direction.

4. The method according to claim 1, wherein, in step 6:
summing the R, G, B values of pixels at the same position in each of the calibrated images from step 5); Selecting the pixel at the corresponding position in the corrected image with the second smallest total sum of R, G, B values as the base color for the corresponding position in the base color texture map; and traversing all position pixels to generate the base color texture map.

5. The method according to claim 1, wherein step 7 comprises:
subtracting the R, G, B values of pixels at the same position in each of the calibrated images from step 5) with the corresponding R, G, B values of pixels in the base color texture map; If the resulting difference is ≤0, it is set to 10; otherwise, it remains unchanged; Then, calculating the variance and range of all differences to calculate the roughness at the corresponding position of the roughness map using the following formula:

roughness=6.5*variance−0.3*range;

traversing all position pixels to generate the roughness texture map.

6. The method according to claim 1, wherein in step 8, for any pixel position in the metallic texture map, the metallic value is calculated as follows:
first, sum the R, G, B values at that position in the base color texture map;
if condition I is met, i.e., the sum of R, G, and B values is less than 390, then the metallic value at that position pixel on the metallic texture map is 0;
if condition I is not met, then subtract the R, G, B values of the same position pixels on each correction image obtained in step 5 from the R, G, B values of the corresponding position pixels on the basic color map; obtain the maximum difference r, g, b for each channel (R, G, B) and calculate the deviation as follows:

deviation=|r−g|+|g−b|;

if condition II is met, i.e., the sum of r, g, b is less than 300 and the deviation is less than 30, then the metallic value at that position pixel on the metallic texture map remains 0;

if neither Condition I nor Condition II is met, then divide the sum of r, g, b by 2 to determine the metallic value at that position in the metallic texture map;

traversing all position pixels to generate the metallic texture map.

7. The method according to claim 1, characterized in that, in step 9), it specifically comprises:

9-1) converting all the calibrated images for the corresponding lower light source from step 5) into grayscale images;

applying a Butterworth high-pass filter with $D_0=20$ and $n=2$ to remove uneven illumination, shadows, and the impact of the base color; Linearly mapping all pixel's R, G, B values to the range of 0 to 255 for contrast enhancement;

9-2) establishing a three-dimensional coordinate system with the center of the testing platform (5) as the origin;

for any calibrated image processed in step 9-1) and any pixel position $P_{xy}$ on it, where x and y represent the two-dimensional coordinates on the plane of that image, considering the center of the image as O, and the center of the light source corresponding to the lighting direction of that image as $P_i$;

calculating the light incidence direction $V=(O-P_i)+0.2*(P_{xy}-P_i)$;

calculating the brightness of pixel $P_{xy}$, Lumin=$R_{xy}*0.299+G_{xy}*0.587+B_{xy}*0.114$, where $R_{xy}$, $G_{xy}$, $B_{xy}$ represent the R, G, B values of pixel $P_{xy}$, respectively;

multiplying the brightness Lumin of the same position pixel in the calibrated images processed in step 9-1) with the corresponding light incidence direction V and then summing them up to obtain the normal value of that position pixel;

traversing all position pixels to generate the normal texture map.

8. The method according to claim 1, wherein step 10), for any pixel position in the transparency texture map, the transparencyalpha is calculated by the following method:

$$\text{alpha} = 1 - \frac{C_0 - C_1}{C_d - C_e},$$

wherein $C_d$ represents the color of the pixel at that position in the image ImageAlpha0, $C_e$ represents the color of the pixel at that position in the image ImageAlpha1, $C_0$ represents the color of the pixel at that position in the image ImageBlend0, and $C_1$ represents the color of the pixel at that position in the image ImageBlend1;

traversing all position pixels to generate the transparency texture map.

9. A storage medium, wherein the storage medium stores a computer program, wherein the computer program is configured to be executed at runtime to perform any one of the methods according to claim 1.

10. An electronic device comprising a memory and a processor, characterized in that the memory stores a computer program, and the processor is configured to run the computer program to execute any one of the methods according to claim 1.

11. The method according to claim 2, wherein step 7 comprises:
   subtracting the R, G, B values of pixels at the same position in each of the calibrated images from step 5) with the corresponding R, G, B values of pixels in the base color texture map; If the resulting difference is ≤0, it is set to 10; otherwise, it remains unchanged; Then, calculating the variance and range of all differences to calculate the roughness at the corresponding position of the roughness map using the following formula:

roughness=6.5*variance−0.3*range;

traversing all position pixels to generate the roughness texture map.

12. The method according to claim 3, wherein step 7 comprises:
   subtracting the R, G, B values of pixels at the same position in each of the calibrated images from Step 5) with the corresponding R, G, B values of pixels in the base color texture map; If the resulting difference is ≤0, it is set to 10; otherwise, it remains unchanged; Then, calculating the variance and range of all differences to calculate the roughness at the corresponding position of the roughness map using the following formula:

roughness=6.5*variance−0.3*range;

traversing all position pixels to generate the roughness texture map.

13. The method according to claim 4, wherein step 7 comprises:
   subtracting the R, G, B values of pixels at the same position in each of the calibrated images from step 5) with the corresponding R, G, B values of pixels in the base color texture map; If the resulting difference is ≤0, it is set to 10; otherwise, it remains unchanged; Then, calculating the variance and range of all differences to calculate the roughness at the corresponding position of the roughness map using the following formula:

roughness=6.5*variance−0.3*range;

traversing all position pixels to generate the roughness texture map.

14. The method according to claim 2, wherein in step 8, for any pixel position in the metallic texture map, the metallic value is calculated as follows:
   first, sum the R, G, B values at that position in the base color texture map;
   if condition I is met, i.e., the sum of R, G, and B values is less than 390, then the metallic value at that position pixel on the metallic texture map is 0;
   if condition I is not met, then subtract the R, G, B values of the same position pixels on each correction image obtained in step 5 from the R, G, B values of the corresponding position pixels on the basic color map; obtain the maximum difference r, g, b for each channel (R, G, B) and calculate the deviation as follows:

deviation=|r−g|+|g−b|;

if condition II is met, i.e., the sum of r, g, b is less than 300 and the deviation is less than 30, then the metallic value at that position pixel on the metallic texture map remains 0;
   if neither Condition I nor Condition II is met, then divide the sum of r, g, b by 2 to determine the metallic value at that position in the metallic texture map;
   traversing all position pixels to generate the metallic texture map.

15. The method according to claim 3, wherein in step 8, for any pixel position in the metallic texture map, the metallic value is calculated as follows:
   first, sum the R, G, B values at that position in the base color texture map;
   if condition I is met, i.e., the sum of R, G, and B values is less than 390, then the metallic value at that position pixel on the metallic texture map is 0;
   if condition I is not met, then subtract the R, G, B values of the same position pixels on each correction image obtained in step 5 from the R, G, B values of the corresponding position pixels on the basic color map; obtain the maximum difference r, g, b for each channel (R, G, B) and calculate the deviation as follows:

deviation=|r−g|+|g−b|;

if condition II is met, i.e., the sum of r, g, b is less than 300 and the deviation is less than 30, then the metallic value at that position pixel on the metallic texture map remains 0;
   if neither Condition I nor Condition II is met, then divide the sum of r, g, b by 2 to determine the metallic value at that position in the metallic texture map;
   traversing all position pixels to generate the metallic texture map.

16. The method according to claim 4, wherein in step 8, for any pixel position in the metallic texture map, the metallic value is calculated as follows:
   first, sum the R, G, B values at that position in the base color texture map;
   if condition I is met, i.e., the sum of R, G, and B values is less than 390, then the metallic value at that position pixel on the metallic texture map is 0;
   if condition I is not met, then subtract the R, G, B values of the same position pixels on each correction image obtained in step 5 from the R, G, B values of the corresponding position pixels on the basic color map; obtain the maximum difference r, g, b for each channel (R, G, B) and calculate the deviation as follows:

deviation=|r−g|+|g−b|;

if condition II is met, i.e., the sum of r, g, b is less than 300 and the deviation is less than 30, then the metallic value at that position pixel on the metallic texture map remains 0;
   if neither Condition I nor Condition II is met, then divide the sum of r, g, b by 2 to determine the metallic value at that position in the metallic texture map;
   traversing all position pixels to generate the metallic texture map.

17. The storage medium of claim 9, wherein, in step 1):
   the top light source is a light source board (3) with perforations and/or transparent areas to allow the photographing device's (6) imaging light path to pass through and/or transmit;
   the upper light source includes multiple groups of upper lights arranged in a circumferential manner along the inner side wall of the box (10) near the top, capable of tilting to illuminate the testing platform (5);
   the lower light source includes multiple groups of lower lights arranged in a circumferential manner along the inner side wall of the box (10) near the bottom, where the lower lights are oriented vertically toward the testing platform (5) or inclined downward toward the testing platform (5);

the installation of the bottom light source can be embedded within the testing platform (5), placed beneath the testing platform (5), or a combination of the aforementioned methods; and the top light source, upper light source, and lower light source are all equipped with diffusers.

18. The storage medium of claim 9, wherein step 3), each pixel's R, G, B values in the color-corrected white paper images are divided by 225, so as to obtain light intensity correction coefficients for each pixel's R, G, B values corresponding to the respective lighting direction.

19. The storage medium of claim 9, wherein step 6:
    summing the R, G, B values of pixels at the same position in each of the calibrated images from step 5); Selecting the pixel at the corresponding position in the corrected image with the second smallest total sum of R, G, B values as the base color for the corresponding position in the base color texture map; and
    traversing all position pixels to generate the base color texture map.

20. The storage medium of claim 9, wherein step 7 comprises:
    subtracting the R, G, B values of pixels at the same position in each of the calibrated images from step 5) with the corresponding R, G, B values of pixels in the base color texture map; If the resulting difference is ≤0, it is set to 10; otherwise, it remains unchanged; Then, calculating the variance and range of all differences to calculate the roughness at the corresponding position of the roughness map using the following formula:

$$roughness = 6.5 * variance - 0.3 * range;$$

traversing all position pixels to generate the roughness texture map.

\* \* \* \* \*